INVENTOR.
Ralph M. Sanders
BY
*W.B.Harpman*
ATTORNEY.

United States Patent Office 3,151,891
Patented Oct. 6, 1964

3,151,891
PIPE COUPLING WITH CONTROLLED WEDGING ACTION OF A CONTRACTIBLE RING
Ralph M. Sanders, Pittsburgh, Pa., assignor, by mesne assignments, to Automatic Sprinkler Corporation of America, Youngstown, Ohio, a corporation of Ohio
Filed Nov. 14, 1960, Ser. No. 68,811
1 Claim. (Cl. 285—110)

This invention relates to a pipe joint and more particularly to a construction for releasably securing the end of a pipe in a coupling by a controlled wedging action of a contractile ring positioned between the coupling and the end of the pipe.

The principal object of the invention is the provision of a pipe joint in which the end of a pipe may be secured to a coupling so that when said pipe joint is subjected to internal fluid pressure the joining members exert axial stresses between the pipe and the coupling rather than radial stresses.

A further object of the invention is the provision of a pipe joint in which a contractile ring-like member is positioned in an annular groove inwardly from the end of the pipe and within a circumferential tapered channel between perpendicular walls in the couplings so that forces tending to separate the pipe and the coupling will move the contractile ring axially along the tapered surface of the channel in the coupling only into locking engagement with the groove around the pipe.

A still further object of the invention is the provision of a pipe joint having means for positively limiting axial movement of the respectve parts of the pipe joint so as to limit wedging pressure between the same.

A still further object of the invention is the provision of a pipe joint including a coupling for slidably receiving the grooved end of a pipe, the coupling having an annular channel in its inner wall with a radially tapered portion sloping towards the pipe receiving end of the coupling and a contractile ring slidably received within the annular channel and normally seated in the groove in the pipe and wherein a positive abutment is formed in the coupling and comprising one wall of said annular channel and against which said contractile ring registers to limit wedging action in the pipe joint.

The pipe joint disclosed herein comprises an improvement in the art of pipe joints and similar tubular couplings wherein pipes and tubular members to be joined in end relation are provided with annular grooves adjacent their ends and engaged in couplings carrying contractile rings adapted to wedge between said grooved ends of said pipes and appropriate surfaces of said couplings to effect a mechanical clamping action holding the pipes against axial movement relative to the couplings. Additionally, resilient gaskets are employed to effect liquid tight seals. Such contractile ring couplings as have heretofore been known in the art have utilized coupling constructions having continuously tapered inner surfaces extending inwardly and toward the ends of said couplings and adapted to wedge the contractile rings between the pipes and the tapered surfaces. Such pipe joints have had the common objection of relying upon a mechanical construction which will crush the pipe or burst the coupling when pressures above normal are introduced into the coupling. The present invention avoids such a disastrous result by provding a simple and inexpensively formed coupling including positive abutments adjacent the ends of the coupling against which the contractile rings are forced after a desirable degree of locking action wedging pressure has been obtained relative to the pipe ends in the coupling. The wedging pressure necessary to a satisfactory operation of the coupling is relatively small and that permitted is sufficient only to hold the contractile rings in the annular grooves in the pipes in the coupling as the present invention obtains its fluid seal from a separate and distinct sealing gasket and utilizes the contractile ring and locking action of the coupling thereagainst solely for holding the pipes in the coupling against axial movement relative thereto.

Another object of the invention is therefore the provision of a pipe joint including a coupling and a contractile ring assembly engageable on the ends of a pipe in which increased fluid pressure within the pipe and the coupling will be primarily evidenced as axial thrust thereby permitting the coupling and the pipe to be formed of lightweight materials or thin sections capable of withstanding a minimal fluid pressure.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figures 1, 2, 3:
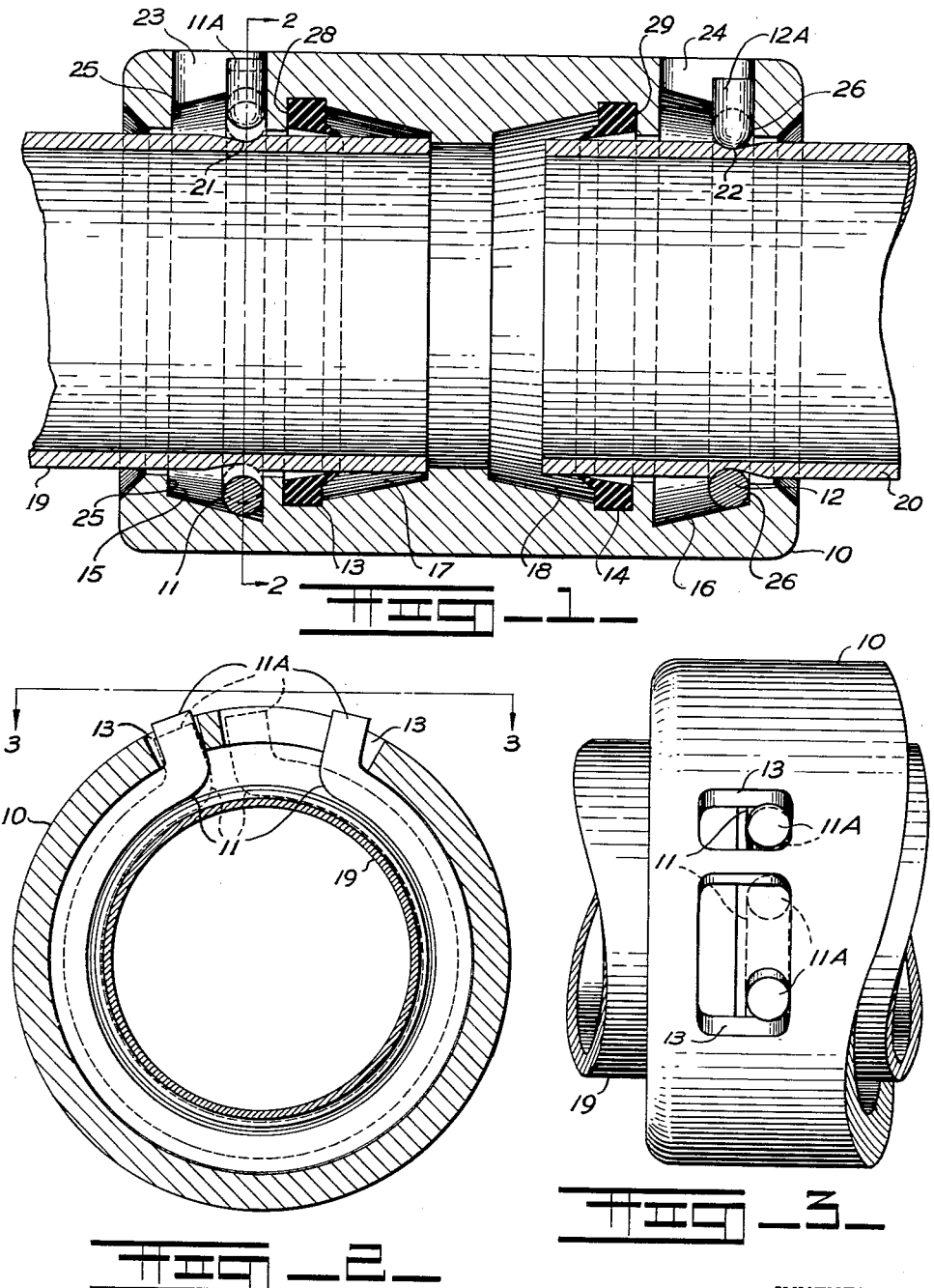
FIGURE 1 is a longitudinal cross section of a pipe joint with solid lines indicating the expanded position of the contractile ring and broken lines indicating its normal position.
FIGURE 2 is a vertical section on line 2—2 of FIGURE 1 with solid lines indicating the expanded position of the contractile ring and broken lines indicating its normal position.
FIGURE 3 is a top plan view on line 3—3 of FIGURE 2 with solid lines showing the expanded position of the ends of the contractile ring and broken lines showing the normal position of the ends of the contractile ring.

By referring to the drawings and FIGURE 1 in particular, it will be seen that the pipe joint comprises a tubular member 10, a pair of contractile split rings 11 and 12, a pair of flanged sealing gaskets 13 and 14 and wherein the inner surface of the tubular member 10 is formed with a plurality of longitudinally spaced annular channels 15 and 16 and 17 and 18. The opposed ends of the two sections of pipes are illustrated positioned in the pipe joint in FIGURE 1 and the end of the pipe shown on the left side of FIGURE 1 is indicated by the numeral 19 and the end of the pipe shown on the right side of FIGURE 1 is indicated by the numeral 20. The pieces of pipe 19 and 20 are provided with external circumferential grooves 21 and 22 respectively which are formed therein inwardly from the terminal ends thereof. The contractile rings 11 and 12 are circular in shape and preferably round in cross section and their ends are outturned as at 11A and 12A and positioned in slot-like openings 23 and 24 formed in the tubular member 10 and communicating with the annular channels 16 and 15 respectively. In the lefthand part of FIGURE 1 and in FIGURES 2 and 3 the contractile ring 11 and the ends 11A thereof are shown in expanded position in solid lines while in the lefthand portion of FIGURE 1 and in FIGURES 2 and 3 the contractile ring 11 and its ends 11A are shown in normal contracted position in broken lines. In the righthand side of FIGURE 1 the contractile ring 12 is shown in normal locked position. It will therefore be observed that in the lefthand side of FIGURE 1 the contractile ring 11 is shown in expanded position to permit the end of the pipe 19 to be moved into this end of the tubular member 10 and into the areas of the annular channels 15 and 17 therein. In such position the flange of the sealing gasket 13 will engage the exterior of the pipe 19 and the contractile ring 11 will upon being released from its expanding means (not shown) be seated on the pipe 19 in the annular groove 21 thereabout as shown in broken lines in the lefthand side of FIGURE 1 and in FIGURES 2 and 3. Fluid pressure applied to the pipe joint as by introducing fluid into the pipe 19 will cause an initial axial movement of the pipe 19 relative to the tubular member 10 of the coupling whereby the contractile ring will move with the pipe into the smaller tapered area of the channel 15 which channel is formed with its inner side deeper than its outer side so that the bottom of the channel 15 slopes radially inward in a direction toward the end of the tubular member 10. The righthand portion of FIGURE 1 shows the resulting locking and sealing action and it will be observed that the contractile ring 12 has moved against an abutment 26 which like the comparable abutment 25 at the other end of the tubular member 10 defines the outermost perpendicular wall of the annular channel 16. It will be observed that similarly formed perpendicular walls 28 and 29 define the respective outer walls of the annular channels 17 and 18 and against which walls 28 and 29 the flanged gaskets 13 and 14 are disposed. It will thus be seen that each of the contractile rings 11 and 12 are adapted to be initially positioned in the tubular member 10 forming the coupling portion of the pipe joint in the annular channels 15 and 16 respectively and in the innermost portions of those channels with their outturned ends 11A and 12A positioned in the slot-like openings 23 and 24. The ends of the pipes 19 and 20 are then inserted into the ends of the tubular member 10 through the expanded contractile rings 11 and 12 and through the sealing gaskets 13 and 14. he ends 11A and 12A of the expanded contractile rings 11 and 12 are then released positioning the contractile rings in the annular grooves 21 and 22 respectively of the pipes and the subsequent application of fluid pressure moves the pipes 19 and 20 axially, outwardly of the tubular member 10, carrying the contractile rings 11 and 12 into locking engagement with the tapered bottoms of the annular channels 15 and 16 to a point against the perpendicular walls 25 and 26. At this particular point, the perpendicular walls 25 and 26 of the annular channels 15 and 16 engage the contractile rings 11 and 12 when they have become positioned so as to hold their contracted shape in the annular grooves 21 and 22 in the ends of the pipes 19 and 20, but prior to the obtaining of a wedging action tending to crush or distort the pipes 19 and 20 or burst the tubular member 10. Those skilled in the art will observe that the action of the contractile rings 11 and 12 is solely to hold the pipes 19 and 20 in the tubular member 10 as the flanged sealing gaskets 13 and 14 provide the fluid seal necessary and like the contractile rings 11 and 12 they are positioned against the perpendicular walls 28 and 29 which prevent outward movement of the gaskets 13 and 14 relative to the tubular member 10. The gaskets 13 and 14 may be made of rubber material, natural or synthetic or any other similar suitable material. The tubular member 10 and the pipes 19 and 20 may be made of any desirable metal or plastic material as may be the contractile rings 11 and 12. Those skilled in the art will observe that fluid pressure within the coupling formed by the tubular member 10 relative to the ends of the pipes 19 and 20 will be safely confined therein and will have no tendency to move the contractile rings 11 and 12 beyond the engagement with the abutments 25 and 26 and there will therefore be no tendency to crush the pipes 19 and 20 nor rupture the tubular member 10 as the fluid pressure within the coupling is confined within the area of the coupling between the flanged gaskets 13 and 14. It will be observed that the outturned ends 11A and 12A of the contractile rings 11 and 12 are positioned in the slot-like openings 23 and 24 which are partitioned so that one of the ends 11A of the contractile ring is separated from the other end 11A and one of the ends 12A of the contractile ring 12 is separated from the other end 12A. This makes possible an easy and convenient expansion of the contractile ring by simply inserting a tool (not shown) between the partition and the one of the ends 11A or 12A and moving it relative thereto as the partition holds the other end 11A or 12A in fixed position thereby simplifying the expanding action of the contractile rings necessary to disengage the coupling from the pipes.

It will thus be seen that the pipe joint disclosed herein will securely hold the pipes in the coupling without marring or collapsing the same or deforming or bursting the coupling even under high pressure thereby permitting the couplings and pipes to be made of lightweight soft materials such as aluminum or plastic tubin. Such pipe joints have been made and tested at pressures in excess of 1,000 p.s.i. without visible marring of the pipe or distortion of the coupling. Those skilled in the art will recognize that similar pipe joints as have heretofore been known in the art and formed of similar materials show definite marring and distortion at much lower pressures and rupture and/or collapse at comparable pressures.

It will thus be seen that an improved pipe joint has been disclosed which meets the several objects of the invention, and having thus described my invention, what I claim is:

A pipe joint comprising a length of cylindrical pipe of constant outside diameter having an external circumferential groove adjacent one end, a tubular coupling for slidably receiving the grooved end of the pipe, a pair of spaced annular channels in the inner wall of the coupling, each of said channels having a side wall toward the end of the coupling in which the pipe is engaged positioned perpendicular to the axis of said coupling, the channel adjacent said end of said coupling having a frusto-conical bottom with its least diameter adjacent said perpendicular side wall, a contractile split ring composed of substantially non-compressible material at least as hard as said pipe, said ring being solid in cross section and slidably received within said last-mentioned channel, said ring adapted to expand over the end of the pipe and to seat itself in the groove around the pipe whereby axial forces tending to separate the pipe and coupling will move the ring along the tapered bottom of said last-mentioned channel and into locking engagement with the groove in said pipe and against said perpendicular side wall of said last-mentioned channel, said split ring having an outside diameter of such a size that when said split ring is fully seated in said groove and one of its side surfaces is contacting said side wall of the channel with the frusto-conical bottom, an outer peripheral surface of said split ring is contacting said frusto-conical bottom, said side wall contacting said split ring preventing said split ring from being wedged between said frusto-conical bottom and said pipe with sufficient force to permanently distort said coupling, split ring or pipe, a flanged gasket positioned in the other one of said channels on the inner side of said perpendicular wall thereof, and means for uncoupling the joint including outturned ends on said contractile ring loosely positioned in a slot in said coupling, said outturned ends adapted to be moved circumferentialy and axially of the coupling to force the ring into the deepest part of said first-mentioned channel and to retain the ring in that position while the pipe is removed from the coupling.

References Cited in the file of this patent

UNITED STATES PATENTS

| | | |
|---|---|---|
| 1,274,406 | Frazier et al. | Aug. 6, 1918 |
| 2,389,825 | Smith | Nov. 27, 1945 |
| 2,522,785 | Hanson | Sept. 14, 1950 |
| 2,805,089 | Hansen | Sept. 3, 1957 |
| 2,950,132 | Kocsuta | Aug. 23, 1960 |

FOREIGN PATENTS

| | | |
|---|---|---|
| 549,886 | Italy | Oct. 18, 1956 |
| 209,947 | Australia | July 29, 1957 |
| 1,174,963 | France | Nov. 10, 1958 |